United States Patent
Buchholz

(10) Patent No.: US 6,260,906 B1
(45) Date of Patent: Jul. 17, 2001

(54) SEALING SYSTEM FOR THE ROOF FRAME OF A MOTOR VEHICLE

(75) Inventor: Hans-Volker Buchholz, Hildesheim (DE)

(73) Assignee: Meteor Gummiwerke K. H. Bädge GmbH & Co., Bockenem (DE)

( * ) Notice: Subject to any disclaimer, the term of this patent is extended or adjusted under 35 U.S.C. 154(b) by 0 days.

(21) Appl. No.: 09/508,560

(22) PCT Filed: Jul. 5, 1999

(86) PCT No.: PCT/EP99/04668

§ 371 Date: Mar. 13, 2000

§ 102(e) Date: Mar. 13, 2000

(87) PCT Pub. No.: WO00/03885

PCT Pub. Date: Jan. 27, 2000

(30) Foreign Application Priority Data

Jul. 13, 1998 (DE) .......................................... 298 12 428 U

(51) Int. Cl.[7] .................................................. B60J 10/08
(52) U.S. Cl. ................... 296/146.9; 296/107.04; 49/480.1; 49/490.1
(58) Field of Search .................... 296/107.04, 107.05, 296/107.06, 146.9, 146.14, 146.15, 146.16; 49/480.1, 482.1, 490.1

(56) References Cited

U.S. PATENT DOCUMENTS

| | | | |
|---|---|---|---|
| 4,123,071 | * 10/1978 | Yamamoto | 49/490 X |
| 4,472,469 | * 9/1984 | Thies | 49/490 X |
| 4,549,761 | * 10/1985 | Lee et al. | 296/146 X |
| 4,614,061 | * 9/1986 | Brocke | 49/490 X |
| 4,894,954 | 1/1990 | Nozaki . | |
| 5,345,717 | * 9/1994 | Mori et al. | 296/146.16 X |
| 5,437,124 | * 8/1995 | Ahlfeld et al. | 49/490.1 X |

FOREIGN PATENT DOCUMENTS

| | | | |
|---|---|---|---|
| 002656701 A | * 6/1977 | (DE) | 49/490.1 |
| 003618278 A | * 12/1987 | (DE) | 49/490.1 |
| 295 09 880 | 9/1995 | (DE) . | |
| 195 31 600 | 3/1997 | (DE) | B60J/10/10 |
| 296 21 997 | 2/1998 | (DE) . | |
| 524 447 | 1/1993 | (EP) . | |
| 000560663 A1 | * 9/1993 | (EP) | 296/146.9 |
| 000628439 A1 | * 12/1994 | (EP) | 296/146.9 |
| 001348298 A | * 3/1974 | (GB) | 49/490.1 |
| 002172642 A | * 9/1986 | (GB) | 49/490.1 |
| 000503986 A | * 4/1956 | (IT) | 49/490.1 |
| 358156415 A | * 9/1983 | (JP) | 296/146.9 |
| 362273137 A | * 11/1987 | (JP) | 296/146.9 |
| 406270689 A | * 9/1994 | (JP) | 296/146.9 |
| WO 97/25218 | 7/1997 | (WO) . | |

* cited by examiner

Primary Examiner—D. Glenn Dayoan
Assistant Examiner—Lori L. Coletta
(74) Attorney, Agent, or Firm—Synnestvedt & Lechner LLP

(57) ABSTRACT

Sealing system is disclosed for the roof frame of a motor vehicle having at least one moveable, frameless window. The sealing system has at least one sealing profile section with a profile strip which is reinforced by a reinforcement and is formed of at least one elastomer. The profile strip cooperates with the window in a sealing manner. The reinforcement is provided with the profile strip as a prefabricated synthetic material injection molded part in a forming tool at least on one part of its surface. The reinforcement has a substantially U-shaped cross section with a base and limbs extending from the base. The sealing system is formed in a three-dimensional manner and can be fixed to connection parts of the roof frame with attachment elements. The reinforcement and the profile strip are partitioned longitudinally in the region of the base.

33 Claims, 9 Drawing Sheets

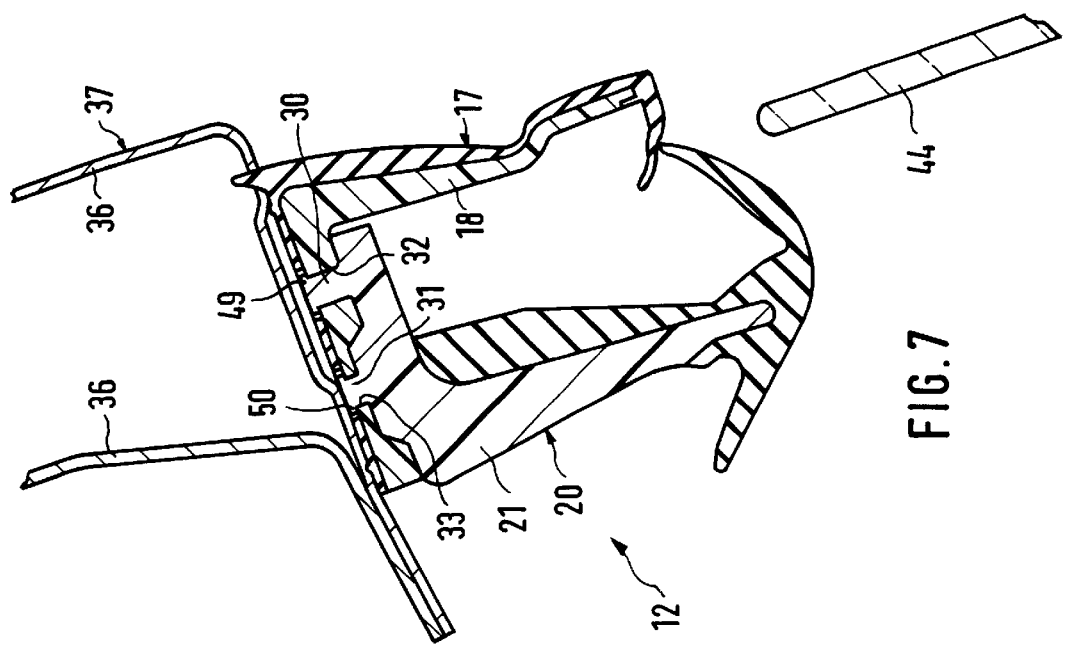
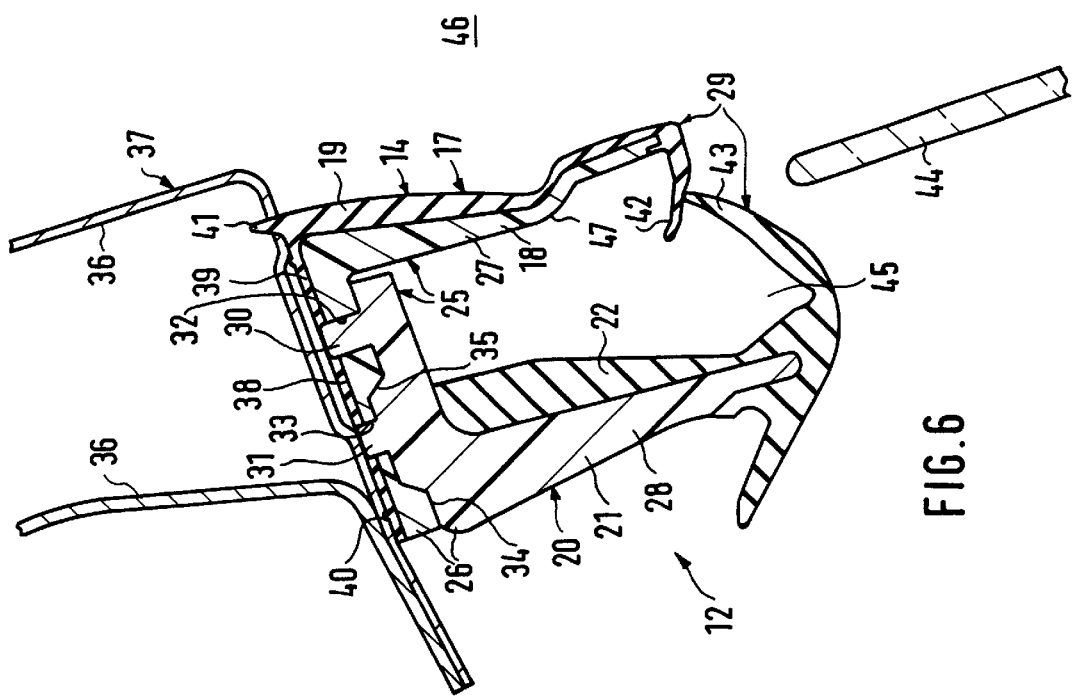

SEALING SYSTEM FOR THE ROOF FRAME OF A MOTOR VEHICLE

FIELD OF THE INVENTION

The invention relates to a sealing system having at least one sealing profile section for the roof frame of an automobile having at least one movable, frameless window.

BACKGROUND OF THE INVENTION

A known sealing system of this type (shown in German utility model DE 296 21 997 U1 of the applicant) does not yet offer sufficient freedom for the optimum design of the profile strip.

One carrier rail which is not divided longitudinally is known from German utility model DE 295 09 880 U1 of the applicant. One area of the carrier rail facing the roof connecting bar is provided with an elastomer layer. A sealing lip of a one-piece elastomer profile strip protrudes in each case from a limb of the carrier rail into a concave side of the sealing profile.

A U-shaped holding rail which is not divided longitudinally is known per se from published German Patent Application DE 195 31 600 A1, wherein a sealing section is attached fixedly adhering in each case to the limbs of the holding rail. Each sealing section comprises a sealing lip which extends as far as the window.

SUMMARY AND OBJECTS OF THE INVENTION

The object of the invention is to achieve greater freedom for designing the profile strip.

This object is achieved by forming a sealing profile section having a profile strip which is reinforced by a reinforcement and consists of at least one elastomer. The profile strip cooperates in a sealing manner with the window. The reinforcement is formed as a pre-fabricated synthetic material injection molded part and is provided with the profile strip on at least a part of its surface in a forming tool. The reinforcement has a substantially U-shaped cross section, with a base and limbs extending from the base, almost over its total length. The sealing system is formed in a three dimensional manner and can be fixed to connection parts of the roof frame with attachment elements. The reinforcement and the profile strip are longitudinally partitioned in the region of the base in each case in to piece parts. Each reinforcement piece part is provided in the forming tool separately with the associated profile strip piece part.

Such sealing systems are used in particular with hardtops or coupés or with a folding roof cover for cabriolets. The longitudinal division provides the opportunity for each reinforcing piece part and the associated profile strip piece part to be designed and formed in an optimum manner. These two components are finally joined together and fixed by means of the attachment elements to the associated connection part. In an advantageous manner, after the components have been joined together, they are placed into a forming tool, in which an end cap is formed as one on at least one end face of each sealing profile section. Details relating to this latter feature are evident in the aforementioned German utility model DE 296 21 997 U1. Each of the components is formed in a three-dimensional manner without any internal stress in a dimensionally-stable and optimum manner from a reinforcing piece part and a profile strip piece part. The sealing system joining the two components also has these characteristics which are ideal as far as the dimensions are concerned and which guarantee that the sealing system is mounted on the motor vehicle with a precise fit, in a manner which can be reproduced and can be performed in a particularly rapid manner. The fact that the sealing system is provided in two parts means that it is possible for the two components to be adjusted relative to each other in the transverse direction and only then are they to be attached to the associated connection part of the roof frame using the attachment elements. In this manner, any peculiarities of the installation arrangement can be taken into consideration and the optimum relative position of the profile strip piece parts can be secured.

To simplify and improve the mounting process of each sealing profile section the reinforcement piece part can be mounted along a partition joint in contact with each other.

The handling of the sealing system is also made easier by fixing the reinforcement piece parts to each other, even for a possible attachment of end caps.

The piece parts are preferably fixed in the partition joint by means of adhesive. The adhesive can be applied over a surface-area or only in spots.

The piece parts may also be fixed by welding. The welding process is preferably performed in the form of a spot-welding process. This is quite sufficient because in any case it is only intended that the two components of the sealing system be fixed in position relative to each other and held in this position until the entire sealing system is fixed by means of the attachment elements to the associated connection part.

The components can be secured to one another through the use of spigots on one reinforcing piece part inserted and secured in an orifice in the other reinforcement piece part. Preferably there is a comparatively tight fit between the spigot and the orifice.

As an alternative, a form-locking fixing arrangement can also be achieved if a free end of each spigot is formed behind the other reinforcement piece part into a head, the cross section of the head being larger than the cross section of the associated orifice.

The two components of the sealing system may be joined together in a precise fit at the partition joint through the use of a profiling for centering the reinforment piece parts relative to each other.

Having a free longitudinal edge of one reinforcement piece part engaging a longitudinal groove of the other reinforcement piece part and locking the free longitudinal edge within the longitudinal groove by means of a latching connection in a form-locking manner ensures that the two components of the sealing system are joined together in a reliable and tight-fitting manner.

Allowing the reinforcement piece parts to be placed one above the other along the partition joint and to be fixed to each other and to the connection part by means of attachment elements makes it possible to adjust the two components of the sealing system in a transverse manner and in a relative manner with respect to each other, prior to the sealing system being attached by means of the attachment elements to the connection part of the roof frame.

To provide an excellent sealing arrangement between the sealing system and the connection part of the roof frame the reinforcement piece part facing the connection part is provided on a surface facing the connection part with a layer of the associated profile strip piece part.

This sealing effect is further improved if required by providing the layer with a sealing lip in the region of at least one of its longitudinal edges, the sealing lip cooperating with the connection part.

Each profile strip piece part comprises a sealing lip associated with a limb, and formed as one in the region of its free end. To avoid the unfavorable visual impression caused by a gap between the sealing lips when the window is disposed outside the sealing system the view into the interior space of the sealing system is blocked by allowing the free ends of the sealing system to overlap each other in a transverse manner with respect to a movement direction of the window. When the window is inserted into the sealing system the free ends lie, in each case, on a side of the window.

Biasing the free ends of the sealing lips against each other makes it impossible for dust and foreign bodies to penetrate into the inside of the sealing system when the window is disposed outside the sealing system.

Providing a stop bead on the reinforcing piece part disposed towards the outer side of the motor vehicle for engaging an outer side of the window inserted into the sealing system limits the extent to which the closed window can move towards the outside if a negative pressure is exerted on the outer side on the window when the vehicle is travelling at high speeds.

Positioning at least one stiffening rib within an interior space of the substantially U-shaped cross section of the sealing system provides additional stiffening to prevent bending and twisting of the reinforcement and thus additional stiffening for the entire sealing system. Whilst providing the same amount of strength, it is possible for the basic profile of the reinforcement to be of a thin-walled design and, as a consequence, the amount of material required is reduced.

Stiffening of the reinforcement may be accomplished by forming at least one stiffening rib as a longitudinal rib extending in the longitudinal direction of the reinforcement, or by forming stiffening ribs as transverse ribs extending in a transverse direction of the reinforcement in spaced disposition from each other in a longitudinal direction of the reinforcement. Preferably each transverse rib extends from one limb of the reinforcement as far as the base of the associated reinforcement piece. The longitudinal ribs are preferably formed as an integral part on the base of the reinforcement and the transverse ribs are located at a spaced disposition of, e.g., 5 to 30 mm.

These and other features and advantages of the invention are further explained hereinunder with reference to the exemplified embodiments illustrated in the drawings.

BRIEF DESCRIPTION OF THE DRAWINGS

FIG. 6 is a sectional view taken along the lines VI—VI in FIG. 5 on an enlarged scale with additional parts of the motor vehicle shown, FIG. 7 is a cross-sectional view corresponding to FIG. 6 of a different embodiment.

DETAILED DESCRIPTION OF PREFERRED EMBODIMENTS

Figure 1:
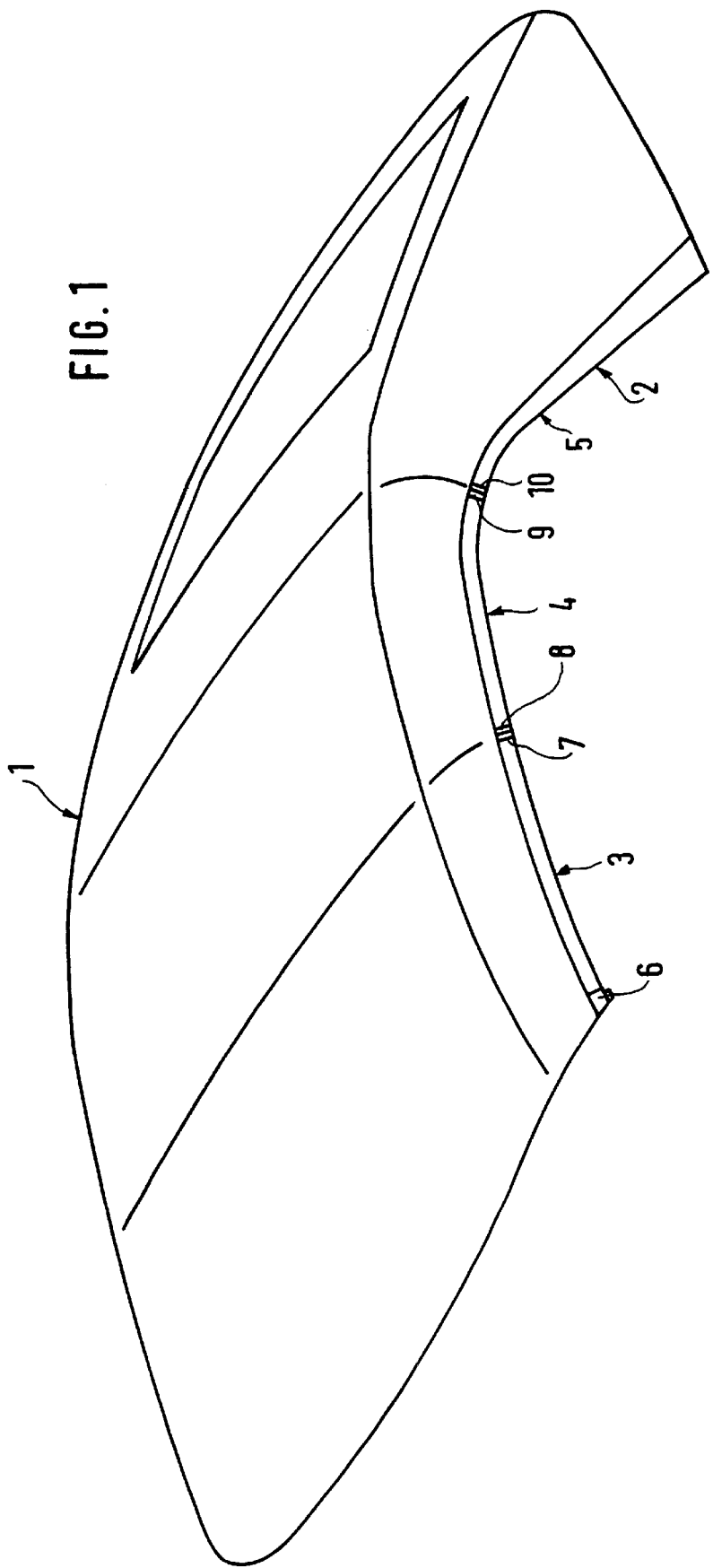
FIG. 1 is a perspective diagonal view from the top of a folding roof of a cabriolet.

FIG. 1 illustrates a folding roof 1 of a cabriolet whose roof frame is provided on each side with a three-part sealing system 2. Each sealing system comprises a front, upper sealing profile section 3, a rear, upper sealing profile section 4 and a C-column section 5. The sections 3 to 5 are attached in each case to connection parts on the associated cover bar. The section 3 comprises integral end caps 6 and 7, section 4 comprises integral end caps 8 and 9 and section 5 comprises an integral end cap 10 on its upper end.

Identical parts bear the identical reference numbers in all the drawings.

Figure 2:
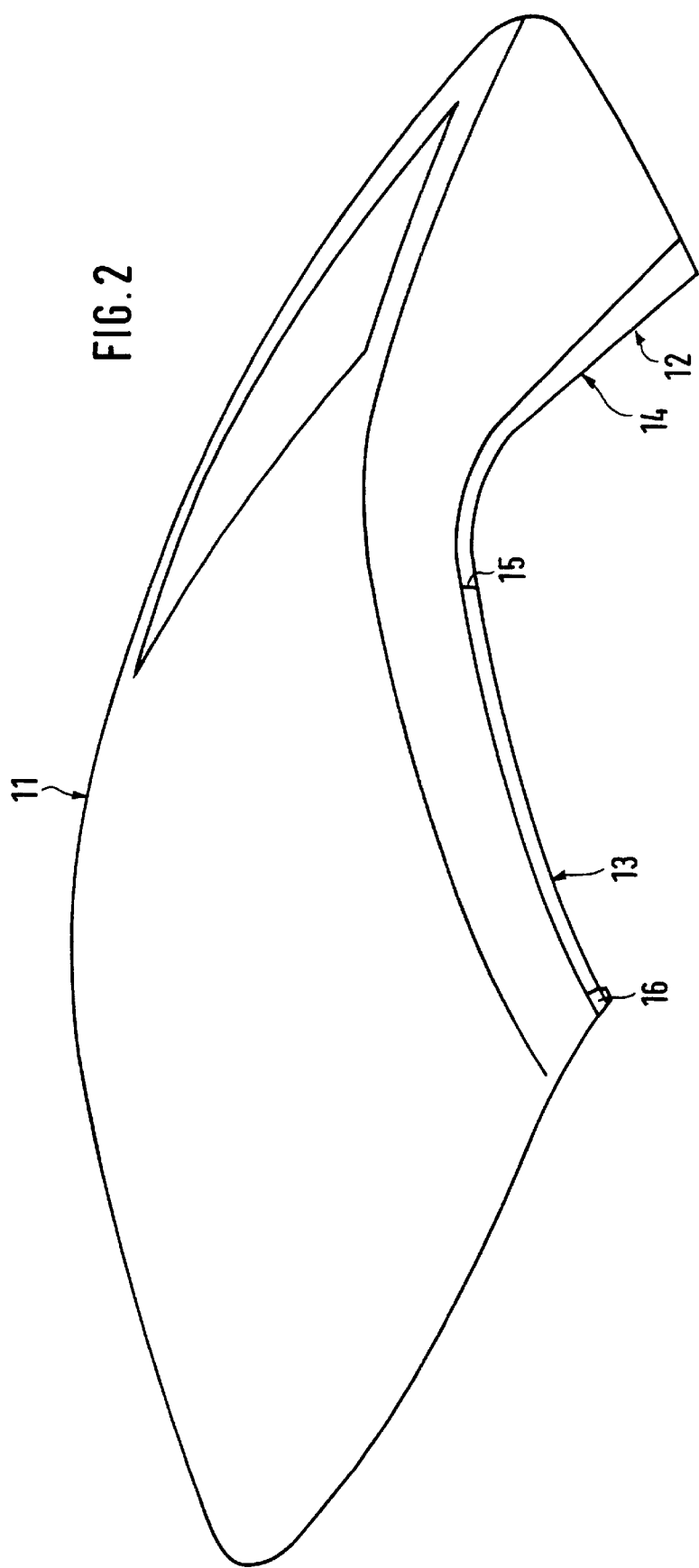
FIG. 2 is a perspective view similar to FIG. 1 of a hardtop.

FIG. 2 illustrates a hardtop 11 whose roof frame is provided on each side with a two-part sealing system 12. Each sealing system 12 comprises a front sealing profile section 13 and a C-column section 14.

The C-column section 14 is in principle formed in the same manner as the C-column section 5 in FIG. 1 and, if necessary, the sealing profile sections 3 and 4 in FIG. 1. In contrast, the sealing profile section 13 preferably consists of an extruded sealing profile which is in one piece and known per se. The sealing profile section 13 is provided at the front with an integral end cap 16 and is connected at the rear on a transition site 15 in a sealing manner to the C-column section 14.

The subsequent figures explain the embodiments of the C-column section 5, 14. Other sealing profile sections, such as the sealing profile sections 3, 4 in FIG. 1, can be formed in a similar manner.

Figure 3:
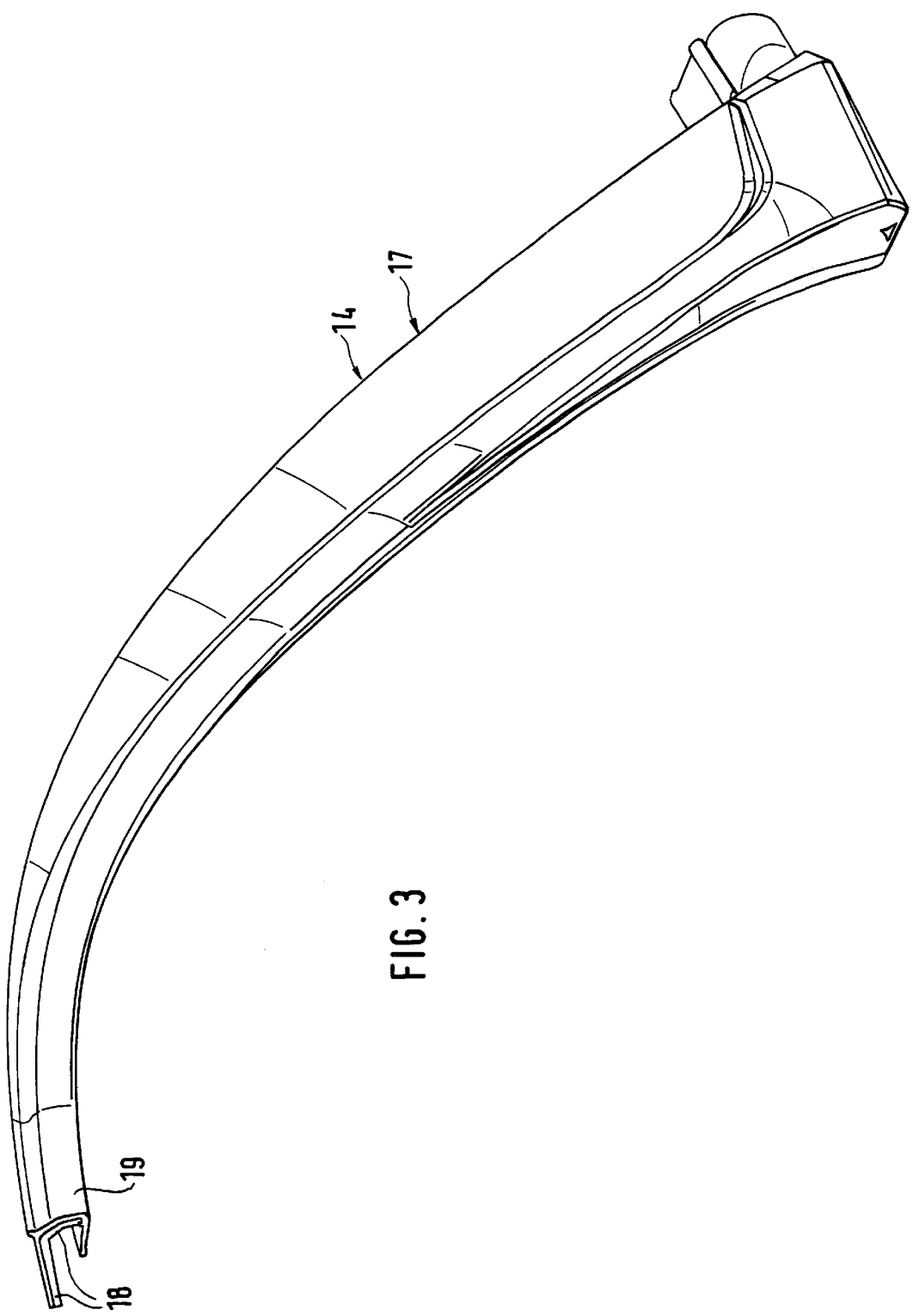
FIG. 3 is a perspective view of a first component of a sealing profile section for the C-column of a motor vehicle.

FIG. 3 illustrates a first component 17 of the C-column section 14. This first component 17 consists of a first reinforcement piece part 18 made from synthetic material and a first profile strip piece part 19 formed as an integral part thereon from an elastomer. The first component 17 is manufactured in such a manner that initially the first reinforcement piece part 18 is manufactured as a synthetic material injection molded part with its final three-dimensional shape. The first reinforcement piece part 18 is then placed into a forming tool where it receives together with the profile strip piece part 19 also its final three-dimensional shape.

Figure 4:
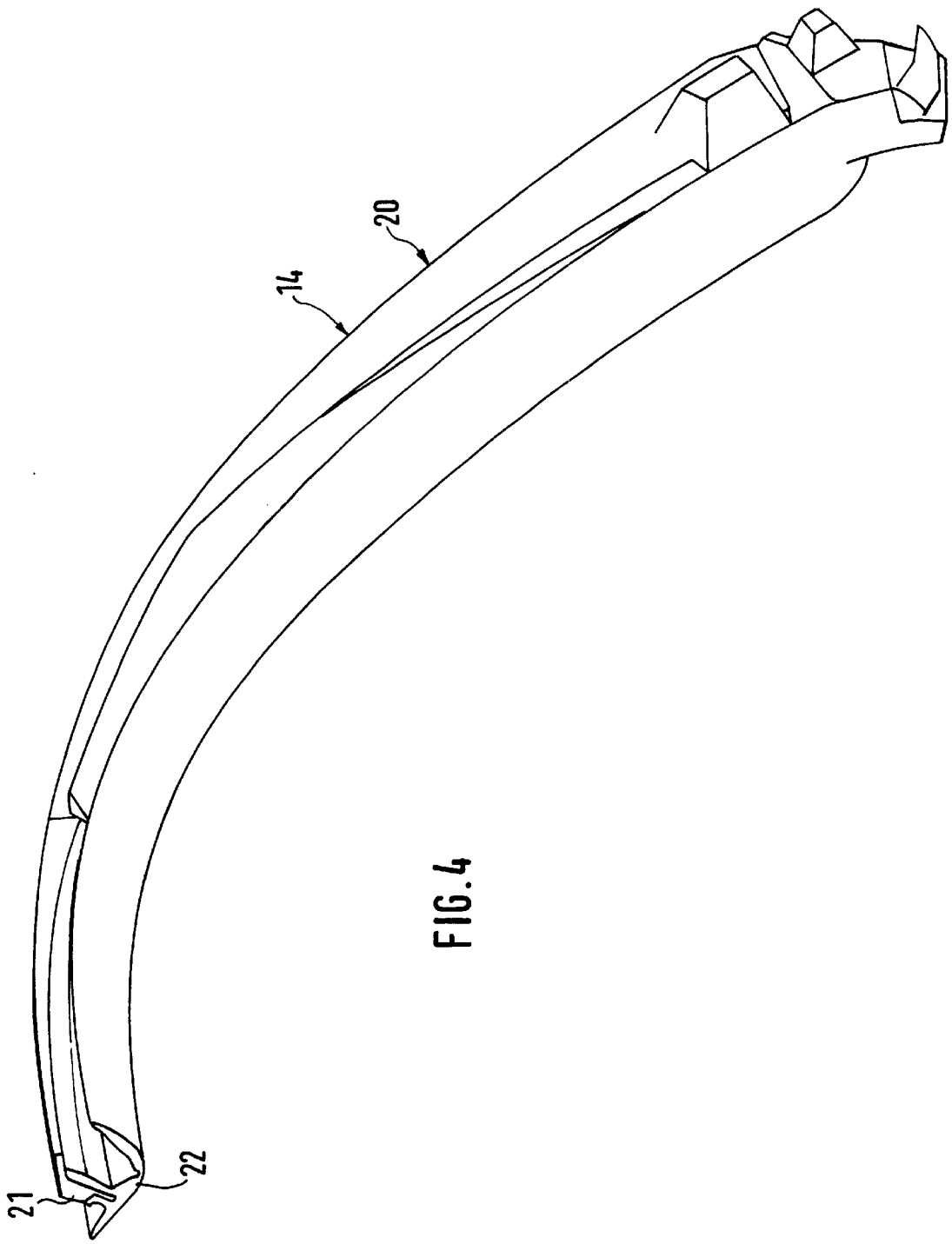
FIG. 4 is a perspective view of a second component for the sealing profile section in accordance with FIG. 3.

FIG. 4 illustrates a second component 20 of the C-column section 14. The second component is formed from a second reinforcement piece part 21 manufactured from a synthetic material and a second profile strip piece part 22 formed as an integral part thereon and manufactured in the same manner as the first component 17.

Figure 5:
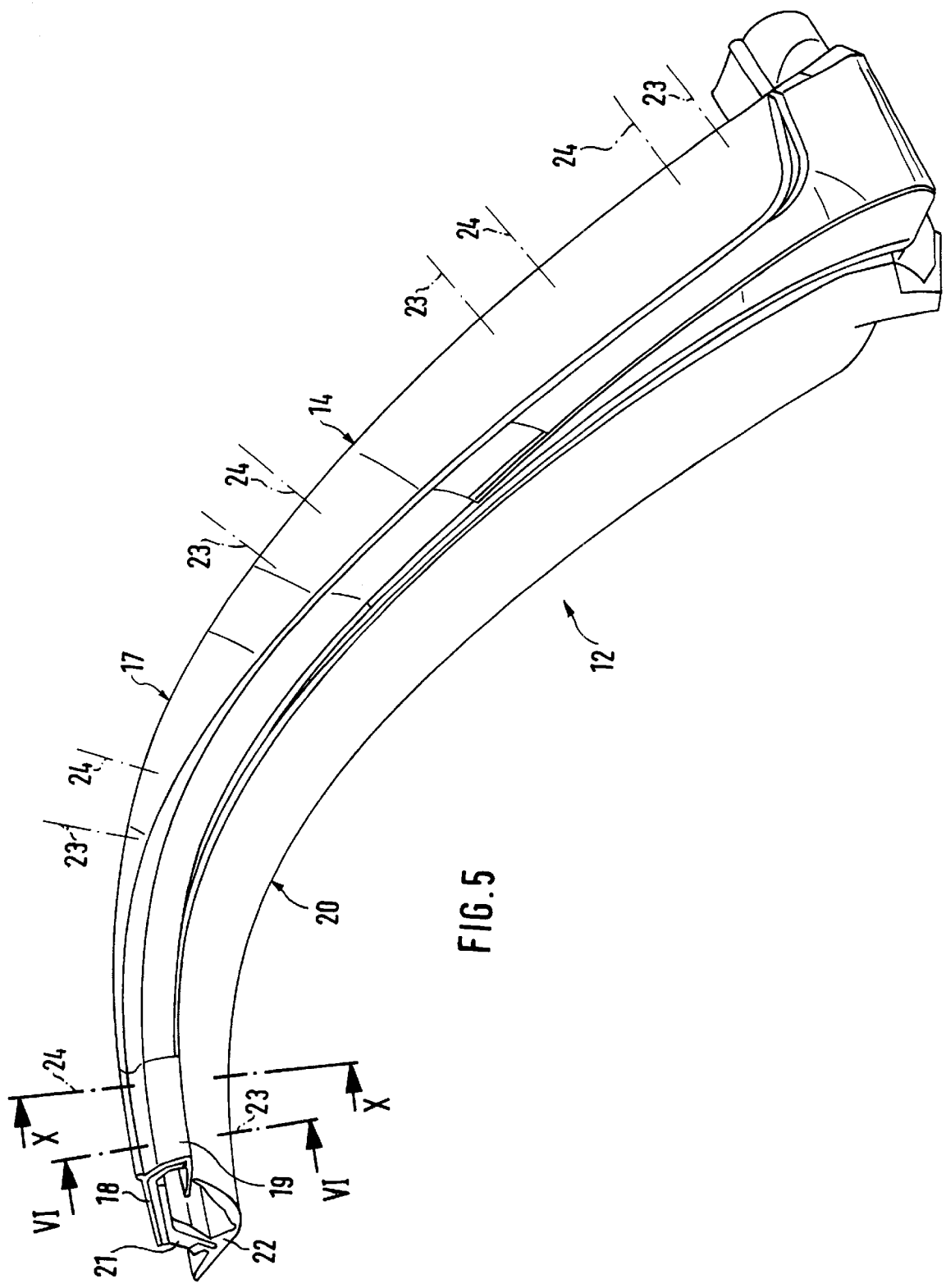
FIG. 5 is a perspective view of the components joined together in accordance with FIGS. 3 and 4.

FIG. 5 illustrates the components 17 and 20 in the joined together state, in which they form the C-column section 14.

Referring to FIG. 5, the dot-dash lines indicate in each case transverse planes 23 and 24 of the C-column section 14. The positioning elements which are to be described in detail later and which position the components 17, 20 in a relative manner with respect to each other are located in the transverse planes 23. In contrast thereto, the attachment elements, which are to be described later and which fix the C-column section 14 to the associated connection part of the roof frame, are disposed in the transverse planes 24.

FIG. 6 illustrates details of the C-column section 14 and its installed state. It is particularly evident that a reinforcement 25 is composed of the two reinforcement piece parts 18, 21. The reinforcement 25 comprises on its at least almost entire length a cross-section which is substantially U-shaped with a base 26 and limbs 27 and 28 which extend from the base. In a similar manner, a profile strip 29 consists of the profile strip piece parts 19, 22 which are each allocated an independent function. The components 17, 20 are positioned and fixed in the case of FIG. 6 in a relative manner with respect to each other by virtue of the fact that spigots 30 and 31 of the second reinforcement piece part 21 sit with a relatively tight fit in the complementary orifices 32 and 33 in the base 26 of the first reinforcement piece part 18. The reinforcement piece parts 18, 21 are mounted in this manner so as to be in contact with each other along a partition joint 34. The partition joint 34 comprises a profiling 35 for centring the reinforcement piece parts 18, 21 in a relative manner with respect to each other.

The C-column section 14 is fixed in accordance with FIG. 6 in a manner to be described later to a connection part 36 which is formed from sheet metal and is part of the roof frame 37 of a motor vehicle. The reinforcement piece part 18 facing the connection part 36 is provided on a surface 38 facing the connection part 36 with a layer 39 of the associated first profile strip piece part 19. The layer 39 comprises in the region of its longitudinal edges in each case a sealing lip 40 and 41 which cooperate with the connection part 36. Both sealing lips 40, 41 are illustrated in FIG. 6 in their fully relaxed starting position. In the ready assembled position in accordance with FIG. 6, the sealing lips 40, 41 are formed naturally and lie against the opposite contour of the connection part 36 as the biassing is increased.

Each profile strip piece part 19, 22 comprises a sealing lip 42 and 43 which is formed as one in the region of a free end of the associated limb 27, 28. In the case of the sealing system 12 assembled in accordance with FIG. 6, the free ends of the sealing lips 42, 43 overlap each other when the window 44 of the motor vehicle is disposed outside the sealing system 12. The free ends of the sealing lips 42, 43 lie preferably in accordance with FIG. 6 in a biassed arrangement against each other. In this manner, on the one hand, a view into an interior space 45 of the sealing system 12 is prevented from becoming impaired and on the other hand, dust and foreign bodies and moisture are prevented from penetrating from the outside into the interior space 45 during this operating state. Sealing lips 42, 43 of this type cannot be achieved in accordance with the aforementioned German utility model DE 296 21 997 U1 as a one-piece design of the sealing system.

Figure 8:
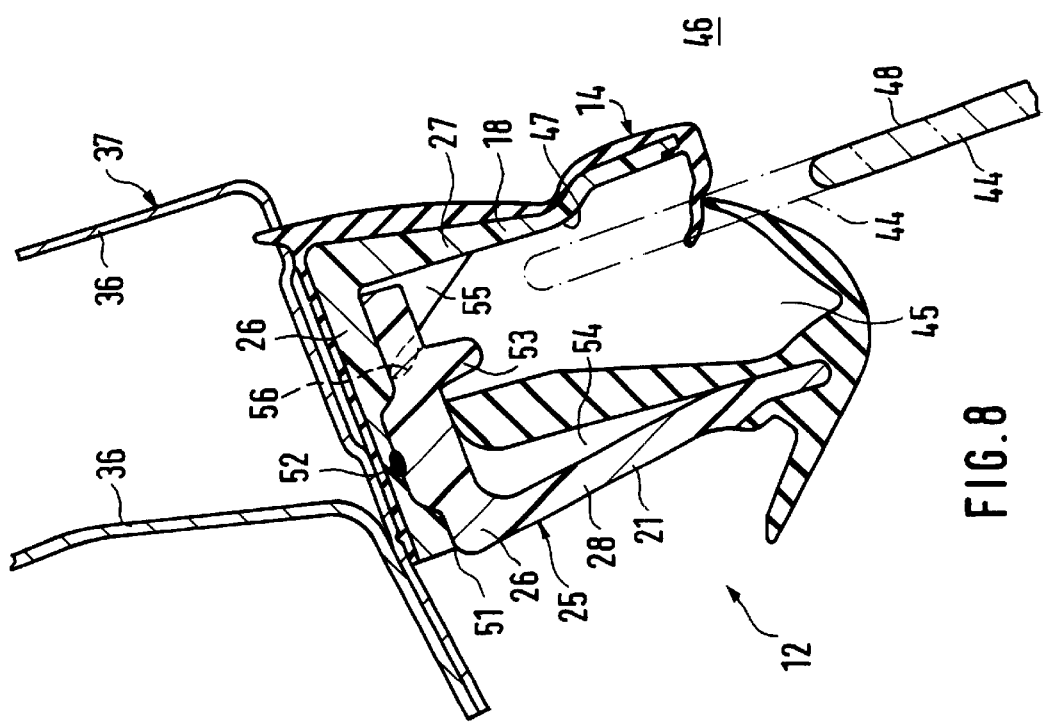
FIG. 8 is a cross-sectional view corresponding to FIG. 6 of a different embodiment.

The reinforcement piece part 18 disposed towards an outer side 46 of the motor vehicle is provided with a stop bead 47 for an outer side 48 of the window 44, which, however, only becomes functional when the window 44 is completely closed in accordance with FIG. 8.

The embodiment in accordance with FIG. 7 corresponds to that of FIG. 6 with the sole difference that a free end of each spigot 30, 31 is formed behind the first reinforcement piece part 18 by virtue of the heat and pressure effect into a head 49 and 50. The cross-section of the heads 49, 50 is greater than the cross-section of the associated orifices 32, 33, so that a form-locking connection is formed between the reinforcement piece parts 18, 21 and thus the components 17, 20.

In accordance with FIG. 8, the reinforcement piece parts 18, 21 are fixed to each other by means of adhesive 51 in the partition joint. As an alternative, this relative fixing arrangement can also be provided by means of weld spots 52 being provided at a spaced disposition with respect to each other.

The reinforcement 25 is provided in accordance with FIG. 8 in the interior space 45 with stiffening ribs 53, 54 and 55. The stiffening rib 53 is formed as a longitudinal rib and formed as one with the second reinforcement piece part 21. In contrast, the stiffening ribs 54 and 55 are formed in each case as transverse ribs which extend in the transverse direction of the reinforcement 25 and are disposed at a spaced disposition with respect to each other in a longitudinal direction of the reinforcement. Each transverse rib 54, 55 extends from the associated limb 28, 27 of the reinforcement 25 as far as up to the base 26 of the associated reinforcement piece part 21, 18. A groove 56, indicated by the broken line, for each stiffening rib 55 is formed in the base 26 of the reinforcement piece part 21.

FIG. 8 also illustrates the window 44 in the dot-dash lines in its fully closed, uppermost position, in which the window 44 is inserted into the interior space 45. If a negative pressure is exerted onto the outer side 46 of the motor vehicle as the vehicle is travelling, then the (closed) window 44 is drawn in, as shown in the right hand side of FIG. 8, and curved until its outer side 48 lies against the stop bead 47. As a result, the extent of the actually undesired outwards movement of the window 44 is limited.

Figure 9:
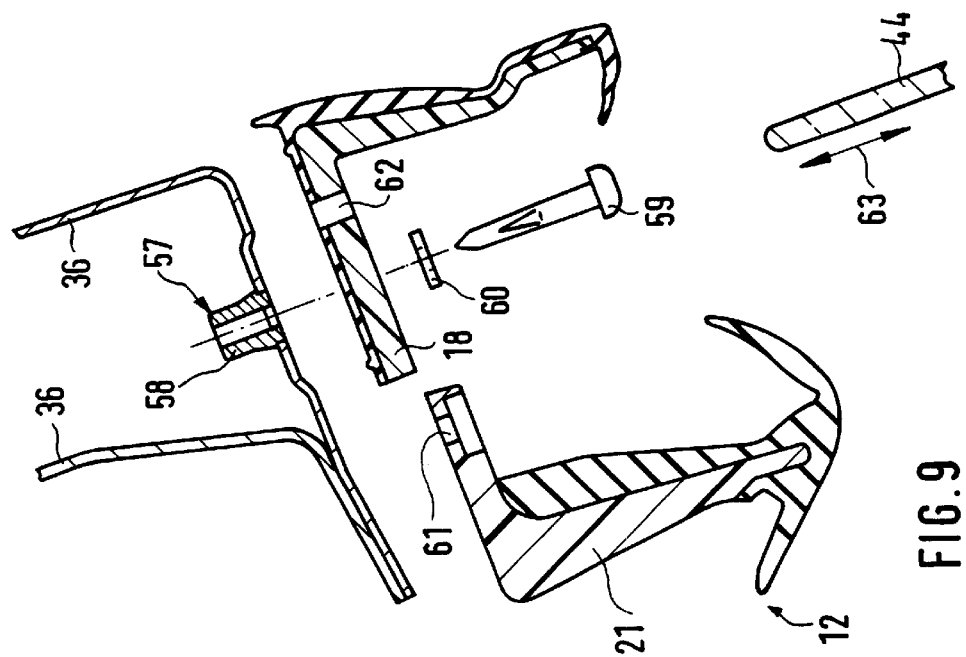
FIG. 9 is a cross-sectional view through individual parts of a further different embodiment.
Figure 10:
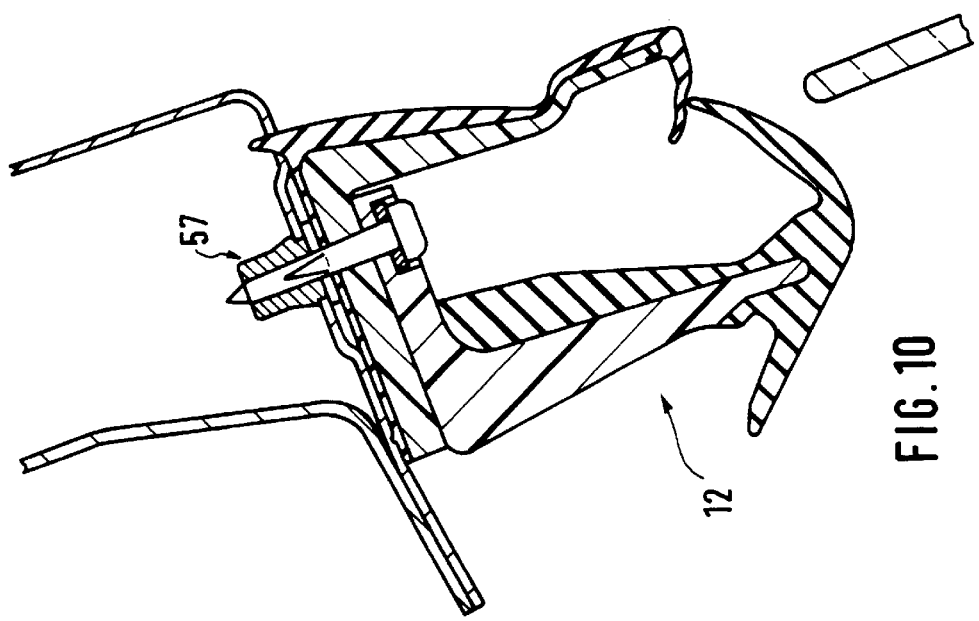
FIG. 10 is an enlarged illustration of the sectional view taken along the lines X—X in FIG. 5 of the embodiment in accordance with FIG. 9.

FIG. 10 represents substantially a cross-sectional view according to the line X—X in FIG. 5. An attachment element 57 is disposed in the associated transverse plane 24 of the sealing system 12 and the individual parts of the attachment element are clearly evident in FIG. 9. A nut piece 58 is disposed on the connection part 36 and receives a pin 59 which first penetrates through a disc 60 and then through orifices 61 and 62 into the reinforcement piece parts 21 and 18 and then into the nut piece 58. The final assembled end position is visible in FIGS. 10 and 11.

FIG. 9 indicates the directions of movement of the window 44 by means of a double arrow 63.

Figure 11:
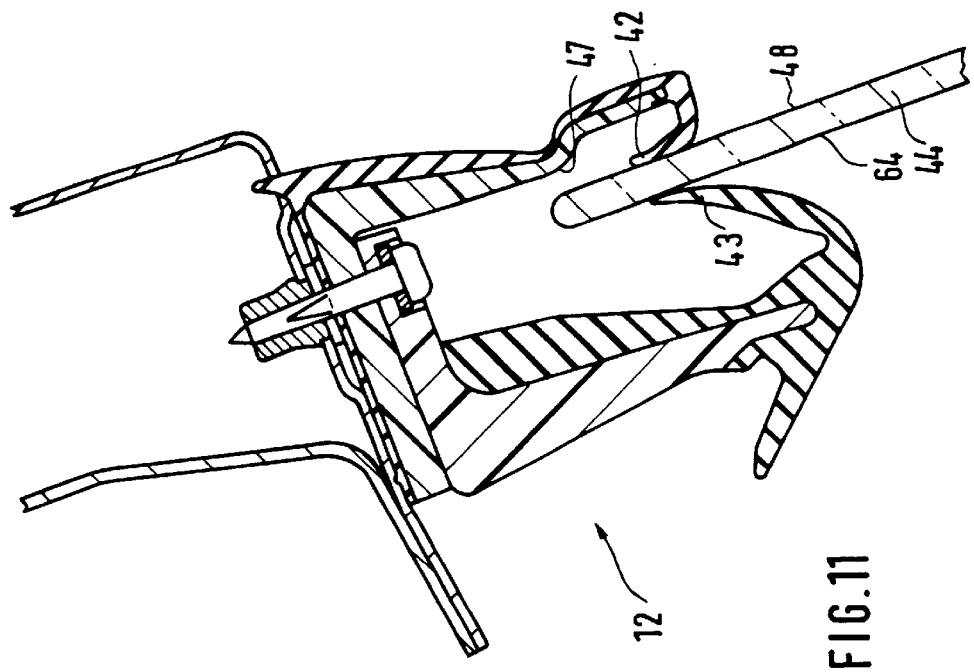
FIG. 11 is a cross-sectional view in accordance with FIG. 10 but with the window inserted into the sealing system and FIG. 12 is a cross-sectional view corresponding to FIG. 6 of a further different embodiment.

FIG. 11 illustrates the window 44 in its uppermost, closed end position. It is also evident that in this end position the free ends of the sealing lips 42 and 43 are located in a sealing arrangement against a side 48 and 64 respectively.

Figure 12:
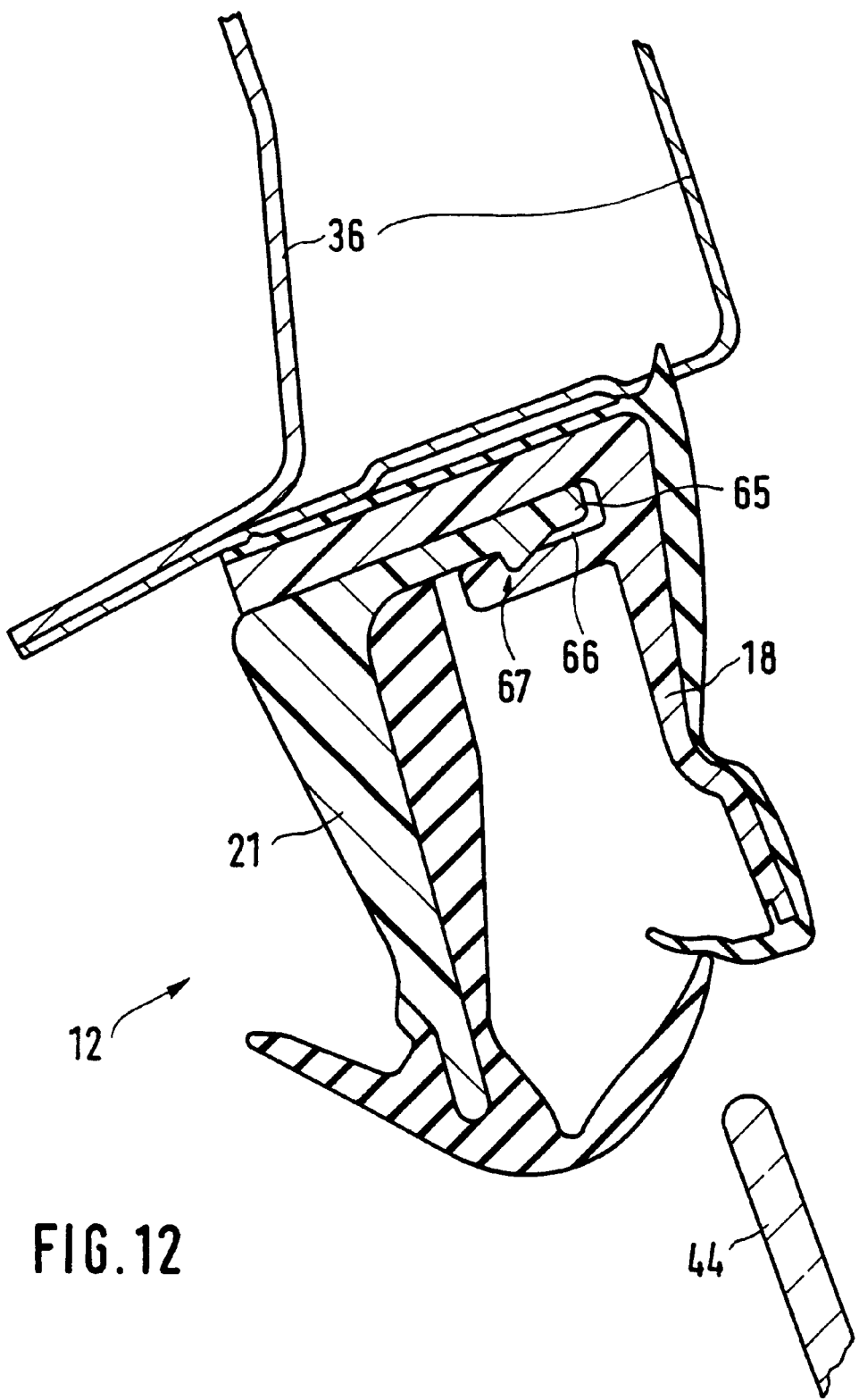

In the case of the exemplified embodiment as shown in FIG. 12, a free longitudinal edge 65 of the second reinforcement piece part 21 engages into a longitudinal groove 66 of the first reinforcement piece part 18. The free longitudinal edge 65 is thereby locked by means of a latching connection 67 in a form-locking manner in the longitudinal groove 66.

Suitable elastomers for the profile strip 29, 19, 22 are, for example, the following materials:

Cellular rubber with a hardness of 10 to 30 Shore-A or dense rubber with a hardness of 30 to 70 Shore-A, both, for example, manufactured from EPDM, SBR, CR, ECO, blends (mixtures) of EPDM with SBR at an EPDM percentage weight of 20 to 90%, blends of EPDM with SBR and/or polyoctenamer, or NBR.

The following thermoplastic elastomers (TPE), for example, can also be used:

TPE on a basis of styrene ethylene butylene styrene (SEB-S).

TPE on the basis of styrene ethylene butylene styrene (SBS)

TPE on the basis of styrene isoprene styrene (SIS)

TPE on the basis of elastomer alloys as TPO blends or TPO alloys, for example, cross-linked EPDM/propylene blend (EPDM/PP) or ethylene vinyl acetate/vinylidene chloride (EVA/PVDC) or TPE on the basis of thermoplastic polyurethane (TPU); TPO is the abbreviation for thermoplastic polyolefins (elastomers).

The profiled strip 29, 19, 22 can also be formed from several of the previously mentioned elastomers and subsequently vulcanised together along the boundary surfaces which are in contact with each other. A chemical bond of sufficient strength now exists in each case between the individual parts of the profile strip 17.

In contrast, the reinforcement 25, 18, 21 consists preferably of a thermoplastic synthetic material. Suitable materials for this purpose, for example, are as follows:

PPE polyphenylene ether

PP polypropylene

PE (LDPE, low density PE)

PE (HDPE, high density PE)

PIB polyisobutylene

PS polystyrene

PA polyamide

PC polycarbonate

PETP polyethylene terephthalate

POM polyoxymethylene

Epoxy resins

Phenol formaldehyde resins

PES polyester

PPO polyphenyl ether

PVP polyvinylchloride or Modifications of these thermoplastic synthetic materials.

These synthetic materials can be used with or without reinforcement, for example, by means of carbon fibres or glass fibres or silicon fibres or polymer fibres or using minerals (talcum).

It is also possible to provide a layer of coupling material (not illustrated) between the profile strip 29, 19, 22 and the reinforcement 25, 18, 21. The coupling material has the task of improving the chemical bond between the elastomer of the profile strip and the thermoplastic synthetic material of the reinforcement. The following materials, for example, are suitable as the coupling material:

EPDM mixed with PP, PE, PS, PIB, PES and other polymers from the aforementioned list of materials of the reinforcement 25, 18, 21 in percentage weights<20%.

Blends EPDM-CR-SBR-polyoctenamer or EPDM compounds with quantities of resin added (e.g. epoxy resins) or other commercially available bonding agents.

If the reinforcement 25, 18, 21 consists of a TPE, then a polypropylene primer, for example, is suitable as a coupling material.

What is claimed is:

1. In a sealing system having at least one elongated sealing profile section for the roof frame of a motor vehicle having at least one moveable frame-less window, said sealing profile section comprising:

a reinforcement having a cross section comprising along at least a majority of its length a base and a pair of limbs extending from said base so as to form a substantially U-shaped cross section, said reinforcement being longitudinally partitioned in the region of said base so as to form first and second reinforcement piece parts each having a respective base portion and a limb thus forming said base and said pair of limbs of said reinforcement;

a profile strip longitudinally partitioned so as to form first and second profile strip piece parts, each of said profile strip piece parts being formed of at least one elastomer, said first profile strip piece part being attached onto at least a surface portion of said first reinforcement piece part, said second profile strip piece part being attached onto at least a surface portion of said second reinforcement piece part, said profile strip cooperating in a sealing manner with said window; and said reinforcement piece parts being formed by injection molding as prefabricated synthetic material piece parts and provided with said attached profile strip piece parts separately in a forming tool.

2. A sealing system according to claim 1, wherein one of said base portions comprises a partition joint for receiving the other of said base portions in contact.

3. A sealing system according to claim 2, wherein said reinforcement piece parts are fixed to each other.

4. A sealing system according to claim 3, wherein said reinforcement piece parts are adhesively fixed to each other along said partition joint.

5. A sealing system according to claim 3, wherein said reinforcement piece parts are fixed to each other by welding along said partition joint.

6. A sealing system according to claim 3, wherein one of said reinforcement piece parts has a plurality of spigots extending from said base portion and the other of said reinforcement piece parts has a plurality of orifices positioned within said base portion and adapted to receive said spigots for fixing said reinforcement piece parts together.

7. A sealing system according to claim 6, wherein said spigots each comprise a free end which extends through the base portion of said other reinforcement piece part when said spigots are received in said orifices, each of said free ends having a head relatively larger than said orifice and retaining said spigots therein.

8. A sealing system according to claim 2, wherein said partition joint comprises a profile for centering the base portions of said reinforcement piece parts relatively to each other.

9. A sealing system according to claim 3, wherein said partition joint comprises a profile for centering the base portions of said reinforcement piece parts relatively to each other.

10. A sealing system according to claim 3, wherein one of said reinforcement piece parts has a free longitudinal edge on said base portion, the other of said reinforcement piece parts has a longitudinal groove along said base portion adapted to receive said free longitudinal edge for joining said reinforcement piece parts together.

11. A sealing system according to claim 10, further comprising a latching connection comprising a projecting member extending from one of said base portions and a receiving indentation positioned in the other of said base portions, said projecting member and said indentation having complementary shapes and engaging each other in form locking manner to retain said free longitudinal edge within said longitudinal groove and fix said reinforcement piece parts together.

12. A sealing system according to claim 2, wherein said base portions are positionable in overlying relationship with one another along said partition joint for attachment to one another and said roof frame by a common fastener.

13. A sealing system according to claim 1, further comprising a layer extending from one of said profile strip piece parts and positionable between one of said base portions and said roof frame when said sealing system is mounted on said motor vehicle.

14. A sealing system according to claim 2, further comprising a layer extending from one of said profile strip piece parts and positionable between one of said base portions and said roof frame when said sealing system is mounted on said motor vehicle.

15. A sealing system according to claim 3, further comprising a layer extending from one of said profile strip piece parts and positionable between one of said base portions and said roof frame when said sealing system is mounted on said motor vehicle.

16. A sealing system according to claim 13, wherein said layer comprises a sealing lip extending outwardly therefrom toward said roof frame, said sealing lip being engagable with said roof frame.

17. A sealing system according to claim 15, wherein said layer comprises a sealing lip extending outwardly therefrom toward said roof frame, said sealing lip being engagable with said roof frame.

18. A sealing system according to claim 1, wherein each of said limbs has a free edge arranged at an end opposite to said base portion, each of said limbs also having a respective sealing lip of the respective profile strip piece part located along said free edge, said sealing lips being arranged on opposite sides of said window when said window is engaged with said sealing system, said sealing lips otherwise being in overlapping relation.

19. A sealing system according to claim 3, wherein each of said limbs has a free edge arranged at an end opposite to said base portion, each of said limbs also having a respective sealing lip of the respective profile strip piece part located along said free edge, said sealing lips being arranged on opposite sides of said window when said window is engaged with said sealing system, said sealing lips otherwise being in overlapping relation.

20. A sealing system according to claim 12, wherein each of said limbs has a free edge arranged at an end opposite to said base portion, each of said limbs also having a respective sealing lip located along said free edge, said sealing lips being arranged on opposite sides of said window when said window is engaged with said sealing system, said sealing lips otherwise being in overlapping relation.

21. A sealing system according to claim 18, wherein said sealing lips are resiliently biased towards each other.

22. A sealing system according to claim 19, wherein said sealing lips are resiliently biased towards each other.

23. A sealing system according to claim 21, wherein said sealing lips are resiliently biased towards each other.

24. A sealing system according to claim 1, wherein one of said reinforcement piece parts is arranged toward the outside of said motor vehicle, said one reinforcement piece part having a stop bead arranged lengthwise there along for accommodating said window upon engagement with said sealing system.

25. A sealing system according to claim 1, further comprising a stiffening rib arranged between said limbs of said firs and second reinforcement piece parts.

26. A sealing system according to claim 18, further comprising a stiffening rib arranged between said limbs of said first and second reinforcement piece parts.

27. A sealing system according to claim 25, wherein said stiffening rib extends lengthwise along said reinforcement.

28. A sealing system according to claim 26, wherein said stiffening rib extends lengthwise along said reinforcement.

29. A sealing rib according to claim 25, further comprising a plurality of said stiffening ribs, each said rib being oriented transversely to said sealing profile section and arranged in spaced apart intervals lengthwise along said sealing profile section.

30. A sealing rib according to claim 27, further comprising a plurality of said stiffening ribs, each said rib being oriented transversely to said sealing profile section and arranged in spaced apart intervals lengthwise along said sealing profile section.

31. A sealing system according to claim 29, wherein each of said ribs extends from one of said limbs to said base portion associated with said one limb portion.

32. A sealing system according to claim 30, wherein each of said ribs extends from one of said limbs to said base portion associated with said one limb portion.

33. A sealing system according to claim 1, wherein said roof frame comprises connection parts, and said sealing system is formed in a three-dimensional manner and can be fixed to said connection parts with attachment elements.

* * * * *

UNITED STATES PATENT AND TRADEMARK OFFICE
CERTIFICATE OF CORRECTION

PATENT NO. : 6,260,906 B1
DATED : July 17, 2001
INVENTOR(S) : Hans-Volker Buchholz It is certified that error appears in the above-identified patent and that said Letters Patent is hereby corrected as shown below:

<u>Title page,</u>
Item [73], Assignee information, change "Bädge" to -- Bädje --.

<u>Column 10,</u>
Line 5, change "claim 21" to -- claim 20 --.
Line 25, change "sealing rib" to -- sealing system --.
Line 29, change "sealing rib" to -- sealing system --.

Signed and Sealed this

Twenty-fifth Day of June, 2002

*Attest:*

JAMES E. ROGAN
*Director of the United States Patent and Trademark Office*

*Attesting Officer*